(12) United States Patent
Wiebenga et al.

(10) Patent No.: US 11,685,288 B2
(45) Date of Patent: Jun. 27, 2023

(54) INTELLIGENT MOTOR VEHICLES AND CONTROL LOGIC FOR MANAGING CHARGING OF TRACTION BATTERY PACKS

(71) Applicant: GM GLOBAL TECHNOLOGY OPERATIONS LLC, Detroit, MI (US)

(72) Inventors: Michelle H. Wiebenga, Farmington Hills, MI (US); Anil Bika, Rochester Hills, MI (US); Wei Li, Troy, MI (US); Mark W. Verbrugge, Troy, MI (US); Charles W. Wampler, Birmingham, MI (US); Chaitanya Sankavaram, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 224 days.

(21) Appl. No.: 17/313,088

(22) Filed: May 6, 2021

(65) Prior Publication Data

US 2022/0355697 A1     Nov. 10, 2022

(51) Int. Cl.
*B60L 58/12*    (2019.01)
*B60L 58/24*    (2019.01)
*B60K 35/00*    (2006.01)
*B60L 58/16*    (2019.01)
*B60L 53/12*    (2019.01)

(52) U.S. Cl.
CPC .............. *B60L 58/12* (2019.02); *B60K 35/00* (2013.01); *B60L 58/16* (2019.02); *B60L 58/24* (2019.02); *B60K 2370/152* (2019.05); *B60L 53/12* (2019.02)

(58) Field of Classification Search
CPC .......... B60L 58/12; B60L 58/16; B60L 58/24; B60K 35/00; B60K 2370/152
See application file for complete search history.

(56) References Cited

U.S. PATENT DOCUMENTS

| 4,860,861 | A  | 8/1989 | Gooch et al. |
| 5,947,243 | A  | 9/1999 | MacDonald |
| 6,405,106 | B1 | 6/2002 | Sheth et al. |
| 7,198,587 | B2 | 4/2007 | Samie et al. |

(Continued)

*Primary Examiner* — James J Lee
*Assistant Examiner* — Jonathan E Reinert
(74) *Attorney, Agent, or Firm* — Quinn IP Law

(57) ABSTRACT

Presented are control systems for operating rechargeable electrochemical devices, methods for making/using such systems, and vehicles with intelligent battery charging and charging behavior feedback capabilities. A method of operating a rechargeable battery includes an electronic controller receiving battery data from a battery sensing device indicative of a battery state of charge (SOC). Using this battery data, the controller determines a number of low SOC excursions at which the battery SOC is below a predefined low SOC threshold and a number of high SOC excursions at which the battery SOC exceeds a predefined high SOC threshold. The controller then determines if the number of low SOC excursions exceeds a predefined maximum allowable low excursions and/or the number of high SOC excursions exceeds a predefined maximum allowable high excursions. If so, the controller responsively commands a resident subsystem to execute a control operation that mitigates degradation of the rechargeable battery.

20 Claims, 2 Drawing Sheets

(56) References Cited

U.S. PATENT DOCUMENTS

| | | |
|---|---|---|
| 7,360,615 B2 | 4/2008 | Salman et al. |
| 7,539,562 B2 | 5/2009 | Maguire et al. |
| 7,653,469 B2 | 1/2010 | Bai et al. |
| 7,681,675 B2 | 3/2010 | Samie et al. |
| 7,810,476 B2 | 10/2010 | Wang et al. |
| 7,862,437 B2 | 1/2011 | Clark et al. |
| 7,878,935 B2 | 2/2011 | Lahr |
| 7,931,561 B2 | 4/2011 | Otanez et al. |
| 7,980,992 B2 | 7/2011 | Sturgin |
| 8,011,464 B2 | 9/2011 | Samie et al. |
| 8,036,785 B2 | 10/2011 | Maguire et al. |
| 8,042,670 B2 | 10/2011 | Bartos et al. |
| 8,073,605 B2 | 12/2011 | Naik et al. |
| 8,091,416 B2 | 1/2012 | Wang et al. |
| 8,095,290 B2 | 1/2012 | Smyth et al. |
| 8,099,220 B2 | 1/2012 | Kim et al. |
| 8,170,818 B2 | 5/2012 | Lin et al. |
| 8,201,444 B2 | 6/2012 | Wang et al. |
| 8,214,122 B2 | 7/2012 | Krupadanam et al. |
| 8,239,076 B2 | 8/2012 | McGarry et al. |
| 8,260,481 B2 | 9/2012 | Naik et al. |
| 8,276,373 B2 | 10/2012 | Wang et al. |
| 8,290,637 B2 | 10/2012 | Krupadanam et al. |
| 8,374,740 B2 | 2/2013 | Druenert et al. |
| 8,392,091 B2 | 3/2013 | Hebbale et al. |
| 8,392,112 B2 | 3/2013 | Bradburn et al. |
| 8,425,364 B2 | 4/2013 | Lahr |
| 8,499,912 B2 | 8/2013 | Samie et al. |
| 8,504,258 B2 | 8/2013 | Tiberg |
| 8,531,158 B2 | 9/2013 | Wang et al. |
| 8,606,483 B2 | 12/2013 | Krupadanam et al. |
| 8,612,119 B2 | 12/2013 | Wang et al. |
| 8,694,197 B2 | 4/2014 | Rajagopalan et al. |
| 9,091,735 B2 | 7/2015 | Wang et al. |
| 9,133,750 B2 | 9/2015 | Levijoki et al. |
| 10,809,733 B2 | 10/2020 | Lindemann et al. |
| 2005/0126878 A1 | 6/2005 | Samie |
| 2006/0064232 A1 | 3/2006 | Ampunan et al. |
| 2008/0051973 A1 | 2/2008 | Gangopadhyay et al. |
| 2008/0265835 A1 | 10/2008 | Reed et al. |
| 2010/0198754 A1 | 8/2010 | Jones et al. |
| 2012/0085082 A1 | 4/2012 | Levijoki et al. |
| 2012/0181953 A1 | 7/2012 | Hsu et al. |
| 2012/0286063 A1 | 11/2012 | Wang et al. |
| 2012/0310561 A1* | 12/2012 | Middleton ........... G01R 31/392 |
| | | 702/63 |
| 2013/0027048 A1 | 1/2013 | Schwarz et al. |
| 2013/0038279 A1 | 2/2013 | Seyerle et al. |
| 2013/0274974 A1* | 10/2013 | Kusumi ................. B60L 58/12 |
| | | 701/22 |
| 2013/0320756 A1* | 12/2013 | Ritter ..................... B60L 58/15 |
| | | 320/136 |
| 2014/0197776 A1 | 7/2014 | Schlaupitz et al. |
| 2014/0254050 A1 | 9/2014 | Haines et al. |
| 2016/0052450 A1 | 2/2016 | Chan et al. |
| 2016/0114692 A1 | 4/2016 | Tripathi et al. |
| 2016/0114698 A1 | 4/2016 | Chow et al. |
| 2016/0245662 A1 | 8/2016 | Rajagopalan et al. |
| 2016/0285296 A1 | 9/2016 | Namou et al. |
| 2016/0333747 A1 | 11/2016 | KanFman |
| 2016/0356616 A1 | 12/2016 | Woon et al. |
| 2017/0113546 A1 | 4/2017 | Maeda |
| 2017/0129495 A1 | 5/2017 | Eguchi |
| 2017/0176199 A1 | 6/2017 | Jones |
| 2017/0267116 A1* | 9/2017 | Lindemann ............. B60L 53/66 |
| 2017/0276902 A1 | 9/2017 | Umezawa et al. |
| 2017/0299401 A1 | 10/2017 | Choi et al. |
| 2018/0058868 A1 | 3/2018 | Kang et al. |
| 2020/0269722 A1* | 8/2020 | Aykol ................ G05B 13/0265 |
| 2020/0353839 A1 | 11/2020 | Tarchinski et al. |
| 2022/0221516 A1* | 7/2022 | Lee ..................... H01M 10/486 |

* cited by examiner

INTELLIGENT MOTOR VEHICLES AND CONTROL LOGIC FOR MANAGING CHARGING OF TRACTION BATTERY PACKS

INTRODUCTION

The present disclosure relates generally to electrochemical devices. More specifically, aspects of this disclosure relate to systems and methods for managing charging events for rechargeable traction battery packs of motor vehicles.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric vehicles (collectively "electric-drive vehicle"), on the other hand, utilize alternative power sources to propel the vehicle and, thus, minimize or eliminate reliance on a fossil-fuel based engine for tractive power.

A full electric vehicle (FEV)—colloquially labeled an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motor(s) and the rechargeable traction battery pack that stores and supplies the requisite power for operating many hybrid and full-electric powertrains. Compared to the low-voltage output of a standard 12-volt starting, lighting, and ignition (SLI) battery, contemporary traction battery packs group stacks of battery cells into individual battery modules that are electrically interconnected in series or parallel and mounted onto the vehicle chassis, e.g., by a battery pack housing or support tray. HV electric systems may employ a front-end DC-to-DC power converter that is electrically connected to the vehicle's traction battery pack(s) in order to increase the supply of voltage to an HV main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

As hybrid and electric vehicles become more prevalent, infrastructure is being developed and deployed to make day-to-day use of such vehicles feasible and convenient. Electric vehicle supply equipment (EVSE) comes in many forms, including residential electric vehicle charging stations (EVCS) purchased and operated by a vehicle owner (e.g., installed in the owner's garage), publicly accessible EVCS disseminated by public utilities or private retailers (e.g., at gas stations or municipal charging stations), and sophisticated high-voltage, high-current charging stations used by manufacturers, dealers, and service stations. Plug-in hybrid and electric vehicles, for instance, can be recharged by physically connecting a charging cable of the EVCS to a complementary charging port of the vehicle. By comparison, wireless charging systems utilize electromagnetic field (EMF) induction to provide vehicle charging capabilities without the need for charging cables and cable ports. Anode and cathode battery materials may be susceptible to degradation due to large state of charge (SOC) swings and extreme operating temperatures. To minimize cell wear and concomitantly maximize the operational life expectancy of the battery pack, it is generally desired to obviate overcharging and undercharging of the pack and pack charging at high and low battery temperatures.

SUMMARY

Presented herein are closed-loop feedback control systems with attendant control logic for operating rechargeable electrochemical devices, methods for making and methods for operating such systems, and electric-drive vehicles with intelligent battery pack charging and charging behavior feedback capabilities. By way of example, methods are presented for predicting and intervening when an operator's charging behavior may lead to premature battery life degradation based on SOC and temperature excursions that exceed corresponding system-calibrated thresholds. An estimated risk level for battery life degradation may be calculated using battery system data, including start SOC and end SOC per charge event, operating age (e.g., vehicle mileage), charging time, charging temperature, and/or operating temperature (e.g., battery temp per drive cycle). This data may be used to identify: (1) the number of/time at/severity of low SOC excursions; (2) the number of SOC charges at low temperatures; (3) the number of/time at/severity of high SOC excursions; and/or (4) time at high temperatures and high SOC. These values may be compared against corresponding crowd-sourced values from other users or compared against corresponding memory-stored, lookup-table values specific to the subject battery system to identify which charging behaviors do and do not need remediation.

Upon determining that prevailing user behavior may be leading to premature battery life degradation, the system may automate preventative action to protect the battery system. For instance, feedback may be provided to the operator to alter their battery use and charging behaviors to prolong battery life. The battery may be protected, for example, by encouraging a user to limit the frequency of charge events outside of specified SOC thresholds. While counterintuitive, it is oftentimes undesirable to charge a battery to 100% SOC or allow the battery to deplete to 0% SOC; as such, a user may be prompted to initiate charging when the battery reaches 10-20% SOC or may be prompted to discontinue charging when the battery reaches 80-90% SOC. Furthermore, the control system may automatically restrict battery charging to predefined SOC and temperature thresholds. The battery system, for instance, may prohibit fast charging at low SOC/low temp or automatically discontinue charging once the battery reaches 80-90%. Battery temp and SOC may be brought within range by activation or restricted use of accessory loads. Automated system intervention may be activated (opt-in) or deactivated (opt-out) by a user.

Aspects of this disclosure are directed to system control logic, closed-loop feedback control techniques, and computer-readable media (CRM) for improving the operational life of an electrochemical device. In an example, a method is presented for operating a rechargeable battery. This representative method includes, in any order and in any combination with any of the above and below disclosed options and features: receiving, via an electronic controller from a battery sensing device, battery data indicative of a battery state of charge (SOC) and a battery temperature of the rechargeable battery; determining, via the electronic controller using the received battery data, a number of low SOC excursions at which the battery SOC is below a predefined low SOC threshold and a number of high SOC excursions at which the battery SOC is above a predefined high SOC threshold; determining if the number of low SOC excursions exceeds a predefined maximum allowable low excursions and/or the number of high SOC excursions exceeds a predefined maximum allowable high excursions; and, if so, responsively transmitting, via the electronic controller to a resident subsystem, a command signal to execute a control operation designed to mitigate degradation of the rechargeable battery.

Additional aspects of this disclosure are directed to closed-loop feedback control systems and intelligent motor vehicles with intelligent battery pack charging and charging behavior feedback capabilities. As used herein, the terms "vehicle" and "motor vehicle" may be used interchangeably and synonymously to reference any relevant vehicle platform, such as passenger vehicles (ICE, REV, FEV, BEV, fully and partially autonomous, etc.), commercial vehicles, industrial vehicles, tracked vehicles, off-road and all-terrain vehicles (ATV), farm equipment, watercraft, aircraft, electric bikes and scooters, etc. For non-automotive applications, disclosed concepts may be implemented for any logically relevant use, including stand-alone power stations and portable power packs, photovoltaic systems, pumping equipment, machine tools, smartphones, laptop and personal computers, appliances, etc. In an example, a motor vehicle includes a vehicle body with a passenger compartment, multiple road wheels attached to the vehicle body, and other standard original equipment. For electric-drive vehicle applications, one or more electric motors operate alone (e.g., for FEV powertrains) or in conjunction with an internal combustion engine assembly (e.g., for HEV powertrains) to selectively drive one or more of the road wheels to thereby propel the vehicle.

Continuing with the discussion of the above example, the vehicle also includes a resident or remote vehicle controller (e.g., electronic control unit, control module, or network of controllers/modules) that regulates, among other things, operation and charging of the traction battery pack. The controller is programmed to receive from one or more battery sensing devices battery data that is indicative of the battery pack's state of charge, temperature, etc. Using this battery data, the controller determines a number of times the battery pack's SOC fell below a predefined low SOC threshold (low SOC excursions) and a number of times the battery pack's SOC exceeded a predefined high SOC threshold (high SOC excursions). The controller then determines if the number of low SOC excursions exceeds a corresponding maximum allowable low excursions and/or if the number of high SOC excursions exceeds a corresponding maximum allowable number of high excursions. If yes to either of the foregoing inquiries, the controller responsively commands a resident vehicle subsystem to execute one or more control operations that help to mitigate degradation of the traction battery pack.

For any of the disclosed systems, methods, and vehicles, the controller determines a rolling evaluation window that varies with battery age (e.g., range of last 5,000 miles of vehicle operation) and/or time (e.g., range of last 30 days of vehicle operation). In this instance, determining the number of low and high SOC excursions is limited to within the rolling evaluation window. As a further option, the controller may intermittently or systematically determine an actual level of degradation of the battery (e.g., measured real-time or near real-time deterioration), and compare the actual level of degradation with an estimated level of degradation of the battery (e.g., derived by benchtop emulator or lab testing) at a current date/age of the battery. The battery age range and/or date range of the rolling evaluation window may be dynamically adjusted in response to the actual level of degradation differing from the estimated level of degradation by at least a predefined differential buffer (e.g., more than about 3-5%). The controller may also determine the magnitude of discrepancy between the actual and estimated levels of degradation; in this instance, the size of dynamic adjustment to the rolling evaluation window's age range/date range is dependent upon the magnitude of discrepancy.

For any of the disclosed systems, methods, and vehicles, the controller may also use the received battery data to determine a number of charges (low SOC charges) in which the battery was recharged with a starting SOC value that is below the predefined low SOC threshold and with a battery temperature that is below a predefined low temperature threshold. If it is determined that the number of low SOC charges exceeds a predefined maximum allowable low SOC charges, a command signal is transmitted to a resident subsystem to execute a control operation to mitigate battery degradation. The controller may also use the received battery data to determine a total time (total high SOC operating time) during which the battery was operated above the predefined high SOC threshold. If this total time exceeds a predefined maximum allowable high operating time, a command signal is transmitted to a resident subsystem to execute a control operation to mitigate any associated battery degradation.

For any of the disclosed systems, methods, and vehicles, the controller may also use the received battery data to determine a total time (total high SOC-temp operating time) during which the battery was operated above the predefined high SOC threshold and at a temperature above a predefined high temperature threshold. If this total operating time exceeds a predefined maximum allowable high SOC-temp operating time, a command signal is transmitted to a resident subsystem to mitigate any associated battery degradation. As yet a further option, received crowd-sourced battery data is indicative of low SOC excursions, high SOC excursions, high SOC operating times, high SOC-temp operating times, etc., for multiple third-party users operating batteries (or vehicles) similar to or the same as the battery (vehicle) being operated by the subject user. In this instance, the various maximum allowable thresholds are derived using the crowd-sourced battery data. Optionally or alternatively, the controller retrieves the predefined threshold values from one or more lookup tables stored in a resident or remote memory device.

For any of the disclosed systems, methods, and vehicles, the predefined low SOC threshold is between about 5% to about 20% SOC and the predefined high SOC threshold is between about 80% to about 95% SOC or, in some implementations about 10% and about 90%, respectively. Optionally, the predefined low temperature threshold is between about −5° C. to 5° C. and the predefined high temperature threshold is between about 35° C. to 45° C. For automotive applications, the resident subsystem may include a rechargeable energy storage system of a motor vehicle; in this example, the control operation includes the RESS limiting or precluding charging operations of the rechargeable battery, e.g., to between the low and high SOC thresholds add/or between the low and high temperature thresholds. An operator of the vehicle may use an electronic input device (e.g., touchscreen display of center-stack console) to input a selection to permit or prevent the RESS from limiting/precluding the charging operation. Optionally, the resident subsystem may include a display device of a motor vehicle; in this example, the control operation may include the display device displaying to an operator of the vehicle one or more predefined remediating actions that mitigate degradation of the rechargeable battery.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Figure 1:
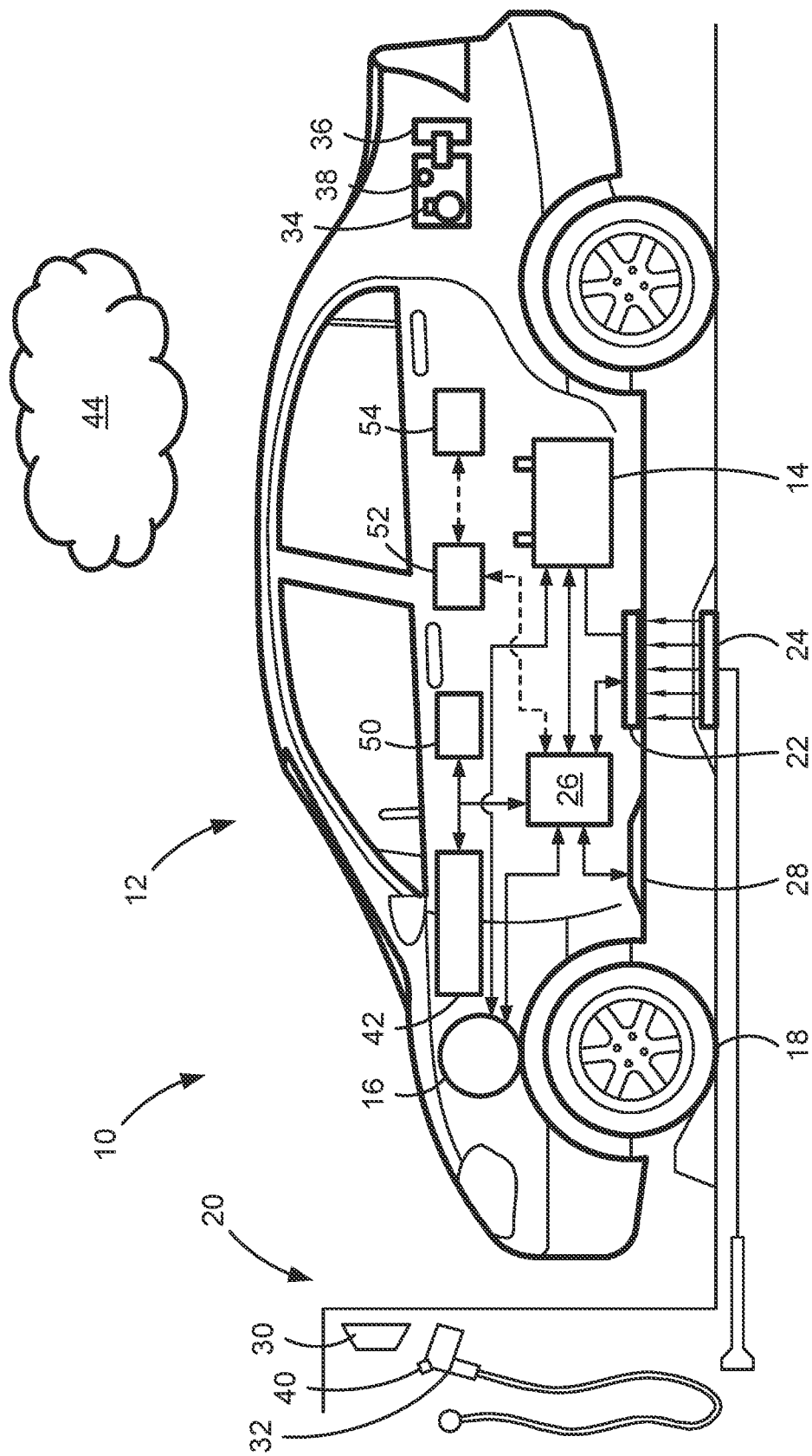
FIG. 1 is a partially schematic, side-view illustration of a representative electric-drive vehicle with intelligent battery charging and charging behavior feedback capabilities according to aspects of the disclosed concepts.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, plug-in battery electric vehicle (BEV). The illustrated automobile 10—also referred to herein as "motor vehicle" or "vehicle" for short—is merely an exemplary application with which novel aspects of this disclosure may be practiced. In the same vein, incorporation of the present concepts into an all-electric BEV powertrain should also be appreciated as a non-limiting implementation of disclosed features. As such, it will be understood that aspects and features of this disclosure may be applied to other electrified powertrain architectures, implemented for any logically relevant type of vehicle, and utilized for both automotive and non-automotive applications alike. Moreover, only select components of the motor vehicles and battery systems are shown and described in additional detail herein. Nevertheless, the vehicles and systems discussed below may include numerous additional and alternative features, and other available peripheral components, for carrying out the various methods and functions of this disclosure.

FIG. 1 is a simplified illustration of the electric-drive vehicle 10 docked at and operably coupled to a vehicle charging station 20 for recharging an onboard rechargeable energy source, such as a high-voltage, direct current (DC) traction battery pack 14. Traction battery pack 14 may take on many suitable configurations, including an array of stacked lead-acid, lithium-ion, or other applicable type of rechargeable electric battery cell. In a non-limiting example, battery pack 14 may be a deep-cycle, high-ampere capacity battery rated for approximately 350 to 800 VDC or more, for example, depending on a desired vehicle range, gross vehicle weight, and power ratings of the various accessory loads drawing electrical power from the vehicle's RESS. To this end, the vehicle RESS may employ a single or multiple high-voltage, high-energy-density battery packs that electrically connect to the vehicle's drive motors. A traction battery pack is generally composed of an array of lithium-ion rechargeable (secondary) battery modules. Each battery module may include a series of electrochemical battery cells, such as stacked pouch-type lithium ion (Li-ion) or Li-ion polymer battery cells, as a non-limiting example.

To provide an operable coupling between the traction battery pack 14 and vehicle charging station 20, the vehicle 10 may include an inductive charging component 22 with an integrated induction coil that is mounted to the underside of the vehicle body 12. This inductive charging component 22 serves as a wireless charging interface that is compatible with a wireless charging pad 24 with an internal EMF coil of the vehicle charging station 20. In the illustrated example, the wireless charging pad 24 is located on the floor of the charging station 20 and situated in accordance with a "target position" that serves as a desired parking location for purposes of efficient and effective wireless charging of the vehicle 10. In particular, FIG. 1 depicts the vehicle 10 parked in proper fore-aft alignment and in proper starboard-port alignment with the charging pad 24—aligned with the target position—to complete an inductive charging event for the battery pack 14 that maximizes the percentage of power transmitted wirelessly between the two devices.

The vehicle charging station 20 may employ any heretofore and hereafter developed type of wired and wireless charging technology, including inductive charging, radio charging, capacitive charging, and resonance charging, as some non-limiting examples. In accordance with electromagnetic induction charging technology, the representative wireless charging pad 24 of FIG. 1 may be activated with electric current to generate an alternating electromagnetic field proximate the inductive charging component 22. This time-variant magnetic field, in turn, induces an electric current in the inductive charging component 22 of the vehicle 10. The induced current may be filtered, stepped-down, and/or phase-shifted by in-vehicle electrical modulation circuitry (e.g., a traction power inverter module (TPIM) 26) to charge the traction battery pack 14 or any other energy source of the vehicle 10 (e.g., a standard 12V lead-acid starting, lighting, and ignition (SLI) battery, an auxiliary power module, etc.).

Traction battery pack 14 stores energy that can be used for propulsion by one or more electric traction motors 16 and for operating other vehicle electrical systems. The traction battery pack 14 is communicatively connected (wired or wirelessly) to one or more vehicle controllers, represented in FIG. 1 by electronic control unit (ECU) 42, that regulate the operation of various onboard vehicle systems and components. Contactors controlled by the ECU 42, for example, may isolate the traction battery pack 14 from select components when opened, and connect the traction battery pack 14 to select components when closed. The ECU 42 is also communicatively connected to the electric traction motor(s) 16 to control, for instance, bi-directional transfer of energy between the traction battery pack 14 and each motor 16. For instance, traction battery pack 14 may provide a DC voltage while the motor(s) 16 may operate using a three-phase AC current; in such an instance, a TPIM 26 governed by ECU 42 converts the DC voltage to a three-phase AC current for use by the motors 16. In a regenerative mode, e.g., in which the traction motor 16 is configured as motor-generator unit (MGU), the ECU-controlled TPIM 26 converts AC power from the motor-generator(s) 16 to DC power compatible with the traction battery pack 14. The representative ECU 42 is also shown communicating with charging component 22, for example, to condition the power supplied from the vehicle charging station 20 to the battery pack 14 to help ensure proper voltage and current levels.

Vehicle charging station 20 of FIG. 1 also offers wired charging for electric vehicle 10 via a "plug-in" electrical connector 32, which may be one of a number of different commercially available electrical connector types. By way of non-limiting example, electrical connector 32 may be a Society of Automotive Engineers (SAE) J1772 (Type 1) or J1772-2009 (Type 2) or International Electrotechnical Commission (IEC) 62196-2 and/or 62196-3 Fdis compatible electrical connector with single-phase or split-phase modes operating at 120 to 240 volts (V) with alternating current (AC) at up to 80 amperes (A) peak current for conductive charging. A charge port 34 accessible on the exterior of vehicle body 12 is a wired charging interface functioning as an electrical inlet into which electrical connector 32 may be plugged or otherwise mated. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the vehicle 10 and station 20 may individually or collaboratively monitor wired/wireless charging availability, wireless power quality, proper vehicle alignment, charge component compatibility, and other related parameters that may affect vehicle charging. According to the illustrated example, the vehicle ECU 42 of FIG. 1 communicates with and receives sensor signals from a monitoring system, which may comprise one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with an assortment of sensors packaged at similar or alternative locations to that shown in the drawings. A CPD sensor 38 mounted by the charge port 34 may sense and may be polled or read by the vehicle's ECU 42 to determine a door status—opened or closed—of the CPD 36. As another option, a latching button 40 that helps to physically attach and secure the electrical connector 32 to the charge port 34 may include an internal switch (e.g., an SAE S3 type switch) that functions as a sensing device to detect whether or not the electrical connector 32 is operatively connected to the charge port 34.

Propulsion of the electric-drive vehicle 10 of FIG. 1 is provided by an electrified powertrain system, which is represented herein by a traction motor 16 that is powered by a rechargeable battery pack 14 through cooperative operation of the ECU 42 and TPIM 26 to drive one or more of the vehicle's road wheels 18. Traction motor 16 may be a brushless permanent magnet (PM), multiphase AC MGU that receives modulated DC electrical power generated by lithium-polymer battery modules inside the chassis-mounted traction battery pack 14. The vehicle 10 may also be equipped with a distributed array of sensors, such as battery temperature sensor 52 and battery voltage/current sensor 54, for monitoring select parameters of the battery pack 14. While shown as an all-electric powertrain architecture with a single motor, the vehicle 10 may employ other FEV and HEV powertrain configurations, including P0, P1, P2.5, P3 and P4 hybrid powertrains, or may be adapted for a PHEV, range-extended hybrid vehicle, fuel-cell hybrid vehicle, other FEVs, etc.

As indicated above, vehicle controller 42 is constructed and programmed to govern select operations of the motor vehicle 10, including control of the components illustrated in FIG. 1. Control module, module, controller, control unit, electronic control unit, processor, microprocessor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s), semiconductor IC devices), input/output circuit(s) and devices, appropriate signal conditioning and buffer circuitry, and other components, such as a high-speed clock, to provide the described functionality, etc. Associated storage and memory 50 (e.g., read only, programmable read only, random access, hard drive, tangible, etc.), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The vehicle controller 42 may be designed with a set of control routines executed to provide desired functions. Control routines are executed, such as by a central processing unit, and are operable to monitor inputs from sensing devices and other networked control modules, and to execute control and diagnostic routines to govern operation of devices and actuators. Such inputs may include vehicle speed and acceleration data, speed limit data, traffic light status and location data, road gradient data, stop sign location data, traffic flow data, geospatial data, road and lane-level data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use. Alternatively, routines may be executed in response to occurrence of an event during operation of the vehicle 10.

During operation of the vehicle 10, battery materials within the traction battery pack 14 are susceptible to degradation that is caused by large swings in cell state of charge and by operating the cells at low and high temperatures. By way of example, and not limitation, the high theoretical capacity of silicon-based materials (e.g., 4200 mAh/g) makes silicon desirable for use as an active anode material for manufacturing negative electrodes of rechargeable lithium-based batteries. However, it has been found that silicon particles within negative electrode active materials with high specific capacities may experience large volume changes (e.g., expansion and contraction of about 300%) during charging/discharging of the lithium-based battery cell. These volume changes may be exacerbated when the battery cells are operated or recharged at extreme temperatures or at relatively high or low SOC. Such severe volume changes during charging/discharging may cause the negative electrode's active material to fracture, decrepitate, or otherwise mechanically degrade, which may result in a loss of electrical contact and poor cycling life. Poor cycling performance often includes a large capacity fade, which may result from the breakdown of contact between the negative electrode active material and conductive fillers in the negative electrode.

To protect a battery pack and the pack's internal cells from premature degradation, an intelligent battery control system may selectively govern discharging and recharging of the battery pack to limit and ameliorate aggressive charging behavior. For instance, techniques are disclosed for predicting and intervening when an EV operator's charging behavior might lead to premature battery life degradation based on SOC and temperature excursions beyond related SOC/temperature thresholds. The system may intervene by instructing an EV driver to limit the frequency of charge events outside of specified SOC/temperature thresholds. Improved battery life may also be achieved by providing operator-specific feedback based on an individual's charging behavior and identified risk factors. Vehicle data, such as charge start SOC and charge end SOC per charge event, vehicle mileage, vehicle operating time, and temperature per drive cycle, is employed to calculate a risk level for premature degradation based on SOC excursions beyond threshold values.

Figure 2:
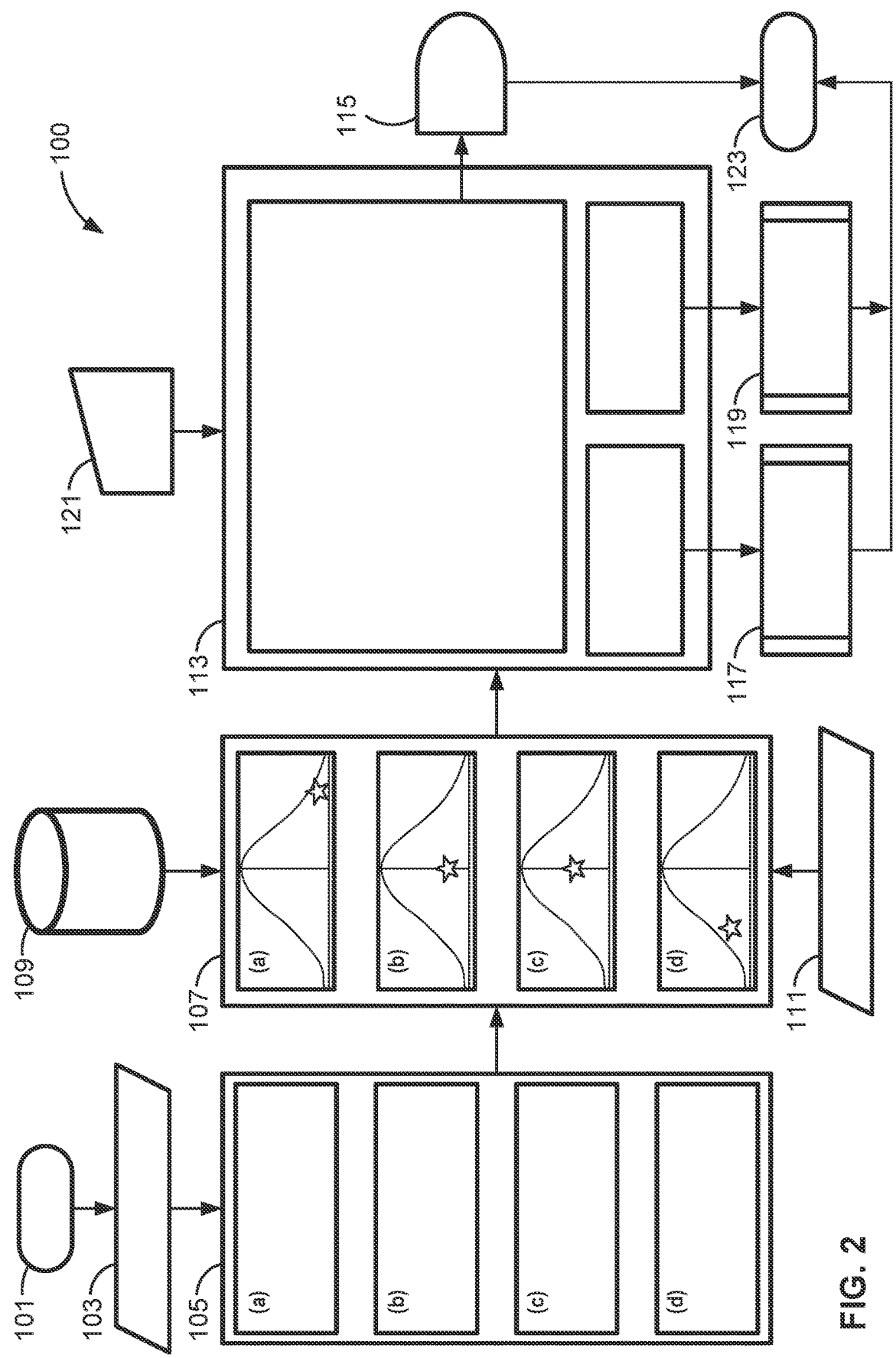
FIG. 2 is a flowchart illustrating a representative charge management control protocol for operating a rechargeable battery, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for intelligent charging and charging behavior feedback for an electrochemical device, such as traction battery pack 14 of FIG. 1, of a high-voltage electrical system, such as electrified powertrain of vehicle 10 of FIG. 1, is generally described at 100 in accordance with aspects of the present disclosure. Some or all of the operations illustrated in FIG. 2, and described in further detail below, may be representative of an algorithm that corresponds to processor-executable instructions that are stored, for example, in main or auxiliary or remote memory (e.g., memory device 50 of FIG. 1), and executed, for example, by an electronic controller, processing unit, logic circuit, or other module or device or network of modules/devices (e.g., ECU 42 and/or cloud computing service 44 of FIG. 1), to perform any or all of the above and below described functions associated with the disclosed concepts. It should be recognized that the order of execution of the illustrated operation blocks may be changed, additional operation blocks may be added, and some of the described operations may be modified, combined, or eliminated.

Method 100 of FIG. 2 begins at terminal block 101 with memory-stored, processor-executable instructions for a programmable controller or control module or similarly suitable processor to call up an initialization procedure for a battery management control protocol. This routine may be executed in real-time, continuously, systematically, sporadically, and/or at regular intervals, for example, each 10 or 100 milliseconds during normal and ongoing operation of the motor vehicle 10. As yet another option, terminal block 101 may initialize responsive to a user command prompt, a resident vehicle controller prompt, or a broadcast prompt signal received from an "off-board" centralized vehicle services system (e.g., a host cloud computing service 44). Upon completion of the control operations presented in FIG. 2, the method 100 may advance to terminal block 123 and temporarily terminate or, optionally, may loop back to terminal block 101 and run in a continuous loop.

Advancing from terminal block 101, the method 100 executes data input/output block 103 and receives vehicle data relevant to the evaluation and control of the on-board traction battery pack. To carry out this operation, a vehicle controller, control system, or any combination of one or more controllers and subsystems may be operable to receive, retrieve, measure, process, and synthesize pertinent information and inputs, and execute control logic and algorithms to regulate various battery system, powertrain system, accessory system, etc., operations to achieve desired control targets. For instance, ECU 42 of FIG. 1 may poll temperature sensor 52 for ambient temperature readings, temperature readings for the traction battery pack 14, and/or respective operating temperatures of the individual battery cells within the pack 14. Additionally, ECU 42 may poll voltage/current sensor 54 for voltage and/or current readings for the traction battery pack 14 and/or respective voltage/current readings of the individual battery cells within the pack 14. The sensor data output by sensor 54 may be processed to determine a battery pack SOC and/or individual battery cell SOCs, e.g., using direct measurement (voltage or impedance-based) SOC estimation techniques, coulomb-counting (current discharge) SOC estimation techniques, adaptive-system (neural network or Kalman-based) SoC estimation techniques, and hybrid techniques. In a more specific example, SOC values may be ascertained for a traction battery pack at the beginning (start SOC) and end (end SOC) of each charge event and at regular intervals during ongoing use of the battery pack.

Using the data collected at data input/output block 103, the method 100 evaluates a set of predetermined "high-risk" behaviors shown to cause premature battery life degradation. In accord with the illustrated example, the method 100 executes process block 105 to determine: (1) a number of low SOC excursions and/or an accumulated time below a low SOC threshold; (2) a number of low SOC charges at low temperature; (3) a number of high SOC excursions and/or an accumulated time above a high SOC threshold; and (4) an accumulated high SOC-temp time above a high SOC threshold and above a high temperature threshold. A low SOC excursion is an operating state in which the battery's SOC has fallen below a predefined low SOC threshold (e.g., 20% SOC in FIG. 1). On the other hand, a high SOC excursion is an operating state in which the battery's SOC exceeds a predefined high SOC threshold (e.g., 80% SOC in FIG. 1). As per item (2) above, a low SOC charge is an operating state in which the battery was recharged with a starting SOC value that is below the predefined low SOC threshold (e.g., 20% SOC) and with a battery temperature that is below a predefined low temperature threshold (e.g., 0° C. in FIG. 1). An accumulated time above the high SOC threshold (also referred to herein as "total high SOC operating time") is the cumulative time during which the battery was operated with a SOC that is above the predefined high SOC threshold. An accumulated high SOC-temp time (also referred to herein as "total high SOC-temp operating time") is the cumulative time during which the battery was operated with an SOC above the high SOC threshold and with a battery temperature above a high-temp threshold (e.g., 80° C. in FIG. 1).

In lieu of looking at a singular incident of potentially detrimental activity, method 100 scrutinizes recurrent harmful behavior to predict when an individual's conduct might lead to premature battery life degradation. Process block 107 of FIG. 2, for example, compares the values derived in process block 105 with benchmark reference values to decide whether or not system-automated intervention should be implemented. In an optional implementation, a set of predefined maximum allowable thresholds is retrieved from a lookup table stored in a memory device, as indicated at database block 109. The set of maximum allowable thresholds may include a maximum allowable number of low SOC excursions (e.g., ten per month), a maximum allowable number of high SOC excursions (e.g., ten per month), a maximum allowable number of low SOC charges (e.g., five per month), a maximum allowable high SOC operating time (e.g., two hours per month), a maximum allowable high SOC/high temp operating time (e.g., one hour per month), or any combination thereof. It should be appreciated that the example threshold values provided above are purely representative in nature and, thus, non-limiting in practice. Moreover, greater, fewer, additional, or alternative behaviors may be monitored at process block 105; correspondingly, greater, fewer, additional, or alternative threshold values may be derived and evaluated at process block 107.

Rather than—or in addition to—retrieving the max allowable threshold values from lookup tables, input/output block 111 collects crowd-sourced data from multiple third-party users that are operating batteries (or vehicles) similar to or the same as the battery (or vehicle) used by the operator under evaluation. A "peer group" may include any/all vehicles with the same or similar battery pack, a single vehicle make/model/year corresponding to the subject user's vehicle, one or more models/year(s) of the same vehicle make, all models of similar size, a particular fleet, a geographic region within which the subject user resides, vehicles operating within a specified temperature range, etc. This crowd-sourced data is aggregated, filtered, and processed to calculate each of the maximum allowable thresholds. In FIG. 2, the thresholds are embodied as peer-to-peer percentile comparisons. By way of example, a flag may be set when a subject user's number of low SOC excursions is at or above the $80^{th}$ percentile when compared to the average number of low SOC excursions of his/her peers. Additionally, a flag will not be set when a subject user's total operating time at high temperature and high SOC is below the $60^{th}$ percentile when compared to the average total time at a high temp/high SOC of his/her peers.

Process block 107 of FIG. 2 determines if each of the subject user's "high-risk" behaviors exceeds its corresponding maximum allowable threshold. In particular, the ECU 42 of FIG. 1 may ascertain whether or not: (1) the number of low SOC excursions exceeds the maximum allowable low excursions; (2) the number of high SOC excursions exceeds the maximum allowable high excursions; (3) the number of low SOC/low temp charges exceeds the maximum allowable SOC/low temp charges; (4) the accumulated time above high SOC threshold exceeds the maximum allowable time above high SOC threshold; and/or (5) the accumulated time at high temp/high SOC exceeds the maximum allowable time at high temp/high SOC. According to the illustrated example, Customer A's number of low SOC excursions (e.g., 11 low SOC excursions) is in the $90^{th}$ percentile and, thus, deemed to exceed the maximum allowable number of low excursions. Contrastingly, Customer A's number of low SOC/low temp charges (e.g., four low SOC/low temp charges) and accumulated time above high SOC threshold (e.g., 1.1 hours) are both within the $50^{th}$ percentile of the user's peers and, thus, deemed to not exceed the corresponding maximum allowable thresholds. Lastly, Customer A's accumulated high SOC-temp time (e.g., 0.3 hours) is in the $20^{th}$ percentile of the user's peers and, thus, deemed to not exceed the maximum allowable high SOC-temp time threshold.

Method 100 may tabulate risk factor frequency per user over a sliding time/mileage window. In accord with a representative example, ECU 42 calls up a rolling evaluation window that varies with battery age (e.g., a vehicle mileage range of most recent 10,000 miles) and/or time (e.g., a date range of most recent 30 calendar days). Once identified, the inquiries of process block 105 (e.g., number of low SOC excursions, number of high SOC excursions, etc.) are determined within this rolling evaluation window. In the same vein, the maximum allowable threshold values and attendant comparisons of process block 107 may be limited to the rolling evaluation window. Any one or more or all of the operations illustrated in FIG. 2 may be carried out via a single or multiple resident vehicle controllers onboard the automobile, via a single or multiple remote vehicle controllers offboard the automobile, or a combination of both.

Closed-loop feedback may be employed to dynamically adjust the rolling evaluation window in order to offset, for example, user-specific and/or battery-specific variations. By way of illustration, ECU 42 may evaluate real-time or historical battery data to determine an actual level of degradation of the traction battery pack 14. ECU 42 then compares this current level of battery pack degradation with an estimated level of degradation of the traction battery pack 14 at the current date and/or age of the pack 14. Responsive to a determination that the actual level of degradation diverges from the estimated level of degradation by at least a predefined differential buffer (e.g., difference of more than about 5%), ECU 42 dynamically adjusts the age or date range of the rolling evaluation window. For instance, if the actual level of degradation is markedly less than the estimated level of degradation, the size of the rolling evaluation window may be increased by a predefined increment. Conversely, if the actual level of degradation is markedly more than the estimated level of degradation, the size of the rolling evaluation window may be decreased by a similar or distinct predefined increment. As yet a further option, the ECU 42 may identify the magnitude of the discrepancy, if any, between the actual and estimated levels of degradation; the size of the dynamic adjustment to the rolling evaluation window may be commensurate with or otherwise dependent upon the calculated magnitude of discrepancy.

As part of the evaluation carried out at process block 107, the method 100 may prioritize the "high-risk" behaviors and scale the system response according to a particular behavior's assigned rank. As a representative case, battery cell chemistry is generally more reactive during high SOC excursions and even more so at high temperatures. Consequently, it may be deemed desirable to limit charging above the high SOC threshold and further limit charging operation at high SOC and high temperatures so as to minimize the allotted time spent at high SOC. In addition, it is noticeably worse to operate the battery at, say, 98% or 99% SOC for T-number of hours than to operate the battery at, say, 81% or 82% SOC for the same T hours. As such, more drastic measures may be taken to ameliorate vehicle operation at 98+% SOC as compared to measures taken to ameliorate vehicle operation at 80-85% SOC. Moreover, the system may prioritize tracking the accumulated time at high SOC/high temp, followed by the accumulated time at high SOC, followed by the number of high SOC excursions, and so on.

For at least some implementations, the method 100 may compute a severity index for one or more of the designated "high-risk" battery behaviors in addition to or as an alternative for tracking a total number of occurrences of each "high-risk" behavior. As a non-limiting example, a severity index may be calculated according to a linear cost function, such as:

$$f(x) = \begin{cases} 0, & \text{if } x \leq x^*; \\ \frac{x-x^*}{1-x^*}, & \text{otherwise.} \end{cases}$$

where x* is an SOC threshold (e.g., x*=0.90) and the severity index is:

$$S(t) = \int_{t-T}^{t} f(x(\tau))d\tau$$

where T is a rolling time window (e.g., one month). In this instance, the index accumulates whenever x is above the threshold x*, and accumulates faster the closer SOC is to 100%. More generally, a weighting function may be defined as:

$$f(x) = \begin{cases} 0, & \text{if } x \leq x^*; \\ g(x), & \text{otherwise.} \end{cases}$$

where g(x) is a function that is positive, e.g., for all x>x* and may increase monotonically to 1 as SOC approaches 100%.s Non-limiting examples include g(x)=1, which integrates time spent above x*; a linear cost, g(x)=(x−x*)/(1−x*); and a quadratic cost, g(x)=(x−x*)$^2$/(1−x*)$^2$.

Method 100 advances from process block 107 to process block 113 and takes ameliorative action to remediate any or all of the subject user's "high-risk" behaviors that have been determined to be likely to erode battery life expectancy. For instance, the ECU 42 of FIG. 1 may automatically respond to the number of low SOC excursions or high SOC excursions exceeding the predefined maximum allowable low/high excursions by transmitting one or more command signals to a resident subsystem to execute a control operation that has been designed to mitigate degradation of the rechargeable battery. In accord with the illustrated example, a "Customer Report Card" is generated for Customer A, which includes a breakdown of the comparisons performed at process block 107 and a suggested corrective action for each of the high-risk behaviors that are deemed problematic. The Customer Report Card presented in FIG. 2, for example, explains that the number of low SOC excursions (e.g., "excursions below 20% SOC") exceeds the maximum allowable low excursions (e.g., is in the 90% percentile and is "MORE THAN PEERS"). The customer is then advised to take "corrective action" in the form of "To improve battery life, start charging when SOC is >20%". As a further example, if the number of low SOC charges exceeds a corresponding system-calibrated value/lookup-table stored value/peer-comparison value, the user may receive an "abuse warning" informing them of the detrimental behavior and providing a corrective action, such as "To avoid battery damage, charge when SOC is >20% and temps above 10° C."

At display operation block 115, the flagged "high-risk" behavior(s) and corresponding corrective action(s) may be provided to the user. By way of non-limiting example, the Report Card of FIG. 2 may be displayed to the user via any suitable medium, including an in-vehicle center stack console, digital instrument cluster, or heads-up display (HUD) device or via text, push or email on an off-vehicle smartphone, laptop, or other personal computing device. Additional report card information may include: (1) values for each of number of low SOC excursions, number of high SOC excursions, number of low SOC/low temp charges, accumulated time at high SOC excursion, and/or accumulated time at high SOC/high temp; (2) user's overall battery usage history; (3) overall battery usage history (including from previous owner(s)); (4) links to additional information, etc. While it may be desirable to "gamify" user charging behavior by comparing individual behavior to peer behavior, as shown, other embodiments may forego crowd-sourced information, e.g., and compare user behavior to emulator or lab-generated thresholds.

Other options for intervening when an operator's charging behavior may lead to premature battery life degradation include automating a system response that is designed to preserve battery integrity. For example, upon determining that the number of low SOC excursions exceeds the predefined maximum allowable low excursions, ECU 42 may automatically limit or, in extreme circumstances, prohibit future vehicle accessory usage (e.g., for the next 2,000 miles or two calendar months) whenever the real-time operating SOC of the traction battery pack 14 is near, at, or below 20% SOC. A corresponding command signal may be transmitted to an auxiliary power module (APM) at subroutine block 117 to limit accessory usage. Likewise, battery fast charging may be limited under predefined circumstances in which repeated, severe, or prolonged low SOC excursions are detected.

Optionally, upon determining that the number of high SOC excursions exceeds the predefined maximum allowable high excursions or that the accumulated time above the high SOC threshold exceeds the predefined maximum allowable time above high SOC, ECU 42 may automatically discontinue vehicle charging (e.g., for each charging event over the next 2,000 miles and/or the next two calendar months) when battery SOC reaches 80%. A corresponding command signal may be transmitted to a charge control module (CCM) at subroutine block 119 to govern future charge events in this manner. Furthermore, battery load may be increased under predefined circumstances in which repeated, severe, or prolonged high SOC excursions are detected. A vehicle operator may be given the option to activate ("opt-in") or deactivate ("opt-out") any or all of the above features, as indicated at manual input block 121.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a rechargeable battery, the method comprising:

receiving, via an electronic controller from a battery sensing device, battery data indicative of a battery state of charge (SOC) and a battery temperature of the rechargeable battery;

determining a rolling evaluation window that varies with a battery age range and/or a date range;

determining an actual level of degradation of the rechargeable battery;

comparing the actual level of degradation with an estimated level of degradation of the rechargeable battery at a current date and/or a current age of the rechargeable battery;

determining a magnitude of discrepancy between the actual level of degradation and the estimated level of degradation;

adjusting the battery age range and/or date range of the rolling evaluation window responsive to the actual level of degradation differing from the estimated level of degradation by at least a predefined differential buffer, a size of the adjustment of the battery age range and/or date range being dependent upon the magnitude of discrepancy;

determining, within the rolling evaluation window via the electronic controller using the received battery data, a number of low SOC excursions at which the battery SOC is below a predefined low SOC threshold and a number of high SOC excursions at which the battery SOC is above a predefined high SOC threshold;

determining if the number of low SOC excursions exceeds a predefined maximum allowable low excursions and if the number of high SOC excursions exceeds a predefined maximum allowable high excursions; and transmitting, via the electronic controller responsive to the number of low SOC excursions exceeding the predefined maximum allowable low excursions and/or the number of high SOC excursions exceeding the predefined maximum allowable high excursions, a command signal to a resident subsystem to execute a control operation predetermined to mitigate degradation of the rechargeable battery.

2. The method of claim 1, wherein determining the rolling evaluation window includes calling up the rolling evaluation window from a memory device.

3. The method of claim 1, wherein determining the actual level of degradation of the rechargeable battery includes evaluating measured battery data to identify a real-time or near real-time battery deterioration, and wherein the estimated level of degradation of the rechargeable battery is derived using benchtop emulator data and/or lab testing data.

4. The method of claim 1, wherein adjusting the battery age range and/or date range of the rolling evaluation window includes dynamically increasing or decreasing a size of the rolling evaluation window if the actual level of degradation is at least 5% less than or more than, respectively, estimated level of degradation.

5. The method of claim 1, further comprising:
determining, via the electronic controller using the received battery data, a number of low SOC charges in which the rechargeable battery was recharged with a starting SOC value of the battery SOC below the predefined low SOC threshold and the battery temperature below a predefined low temperature threshold; and
determining if the number of low SOC charges exceeds a predefined maximum allowable low SOC charges,
wherein the command signal is transmitted to the resident subsystem further in response to the number of low SOC charges exceeding the predefined maximum allowable low SOC charge excursions.

6. The method of claim 1, further comprising:
determining, via the electronic controller using the received battery data, a total high SOC operating time during which the rechargeable battery was operated with the battery SOC above the predefined high SOC threshold; and
determining if the total high SOC operating time exceeds a predefined maximum allowable high SOC operating time,
wherein the command signal is transmitted to the resident subsystem further in response to the total high SOC operating time exceeding the predefined maximum allowable high SOC operating time.

7. The method of claim 1, further comprising:
determining, via the electronic controller using the received battery data, a total high SOC-temp operating time during which the rechargeable battery was operated with the battery SOC above the predefined high SOC threshold and the battery temperature above a predefined high temperature threshold; and
determining if the total high SOC-temp operating time exceeds a predefined maximum allowable high SOC-temp operating time,
wherein the command signal is transmitted to the resident subsystem further in response to the total high SOC-temp operating time exceeding the predefined maximum allowable high SOC-temp operating time.

8. The method of claim 1, further comprising:
receiving crowd-sourced battery data indicative of low and high SOC excursions for a multitude of third-party users operating batteries similar to or the same as the rechargeable battery; and
determining the predefined maximum allowable low and high excursions using the crowd-sourced battery data.

9. The method of claim 1, further comprising retrieving the predefined maximum allowable low and high excursions from a lookup table stored in a memory device.

10. The method of claim 1, wherein the predefined low SOC threshold is between 5% to 20% SOC and the predefined high SOC threshold is between 80% to 95% SOC.

11. The method of claim 1, wherein the resident subsystem includes a rechargeable energy storage system (RESS) of a motor vehicle, and wherein the control operation includes limiting or precluding, via the RESS, a charging operation of the rechargeable battery.

12. The method of claim 11, further comprising receiving, from an operator of the motor vehicle via an electronic input device, a selection to permit or prevent the RESS to limit or preclude the charging operation.

13. The method of claim 1, wherein the resident subsystem includes a display device of a motor vehicle, and wherein the control operation includes displaying, via the display device to an operator of the motor vehicle, one or more predefined remediating actions that mitigate degradation of the rechargeable battery.

14. An electric-drive vehicle comprising:
a vehicle body with multiple road wheels rotatably attached to the vehicle body;
an electric traction motor attached to the vehicle body and operable to drive one or more of the road wheels to thereby propel the electric-drive vehicle;
a rechargeable traction battery pack attached to the vehicle body and operable to power the electric traction motor; and
a vehicle controller programmed to:
receive battery data from a battery sensing device indicative of a battery state of charge (SOC) and a battery temperature of the traction battery pack;
determine a rolling evaluation window that varies with a battery age range and/or a date range;
determine an actual level of degradation of the traction battery pack;
compare the actual level of degradation with an estimated level of degradation of the traction battery pack at a current date and/or a current age of the traction battery pack;
determine a magnitude of discrepancy between the actual level of degradation and the estimated level of degradation;
adjust the battery age range and/or date range of the rolling evaluation window responsive to the actual level of degradation differing from the estimated level of degradation by at least a predefined differential buffer, a size of the adjustment of the battery age range and/or date range being dependent upon the magnitude of discrepancy;
determine, within the rolling evaluation window using the received battery data, a number of low SOC excursions at which the battery SOC is below a predefined low SOC threshold and a number of high SOC excursions at which the battery SOC is above a predefined high SOC threshold;
determine if the number of low SOC excursions exceeds a predefined maximum allowable low excursions and if the number of high SOC excursions exceeds a predefined maximum allowable high excursions; and
responsive to the number of low SOC excursions exceeding the predefined maximum allowable low excursions and/or the number of high SOC excursions exceeding the predefined maximum allowable high excursions, transmit a command signal to a resident vehicle subsystem to execute a control operation predetermined to mitigate degradation of the traction battery pack.

15. The electric-drive vehicle of claim 14, wherein determining the rolling evaluation window includes calling up the rolling evaluation window from a memory device.

16. The electric-drive vehicle of claim 14, wherein the vehicle controller is further programmed to:
determine, using the received battery data, a number of low SOC charges in which the traction battery pack was recharged with a starting SOC value of the battery SOC below the predefined low SOC threshold and the battery temperature below a predefined low temperature threshold; and
determine if the number of low SOC charges exceeds a predefined maximum allowable low SOC charge excursions,
wherein the command signal is transmitted to the resident vehicle subsystem further in response to the number of low SOC charges exceeding the predefined maximum allowable low SOC charge excursions.

17. The electric-drive vehicle of claim 14, wherein the vehicle controller is further programmed to:
determine, using the received battery data, a total high SOC operating time during which the traction battery pack was operated with the battery SOC above the predefined high SOC threshold; and
determine if the total high SOC operating time exceeds a predefined maximum allowable high operating time,
wherein the command signal is transmitted to the resident vehicle subsystem further in response to the total high SOC operating time exceeding the predefined maximum allowable high SOC operating time.

18. The electric-drive vehicle of claim 14, wherein the vehicle controller is further programmed to:
determine, using the received battery data, a total high SOC-temp operating time during which the traction battery pack was operated with the battery SOC above the predefined high SOC threshold and the battery temperature above a predefined high temperature threshold; and
determine if the total high SOC-temp operating time exceeds a predefined maximum allowable high SOC-temp operating time,
wherein the command signal is transmitted to the resident vehicle subsystem further in response to the total high SOC-temp operating time exceeding the predefined maximum allowable high SOC-temp operating time.

19. The electric-drive vehicle of claim 14, wherein the vehicle controller is further programmed to:
receive crowd-sourced battery data indicative of low and high SOC excursions for a multitude of third party users operating vehicles with battery packs similar to or the same as the traction battery pack; and
determine the predefined low and high SOC thresholds using the crowd-sourced battery data.

20. The electric-drive vehicle of claim 14, wherein the resident vehicle subsystem includes a display device mounted within a passenger compartment of a motor vehicle, and wherein the control operation includes displaying, via the display device to an operator of the vehicle, one or more predefined remediating actions that mitigate degradation of the rechargeable battery.

* * * * *